Oct. 26, 1965  C. C. MINTER  3,213,927
METHOD AND APPARATUS FOR THERMODYNAMIC TREATMENT OF FLUIDS
Filed July 17, 1963

INVENTOR
Clarke C. Minter

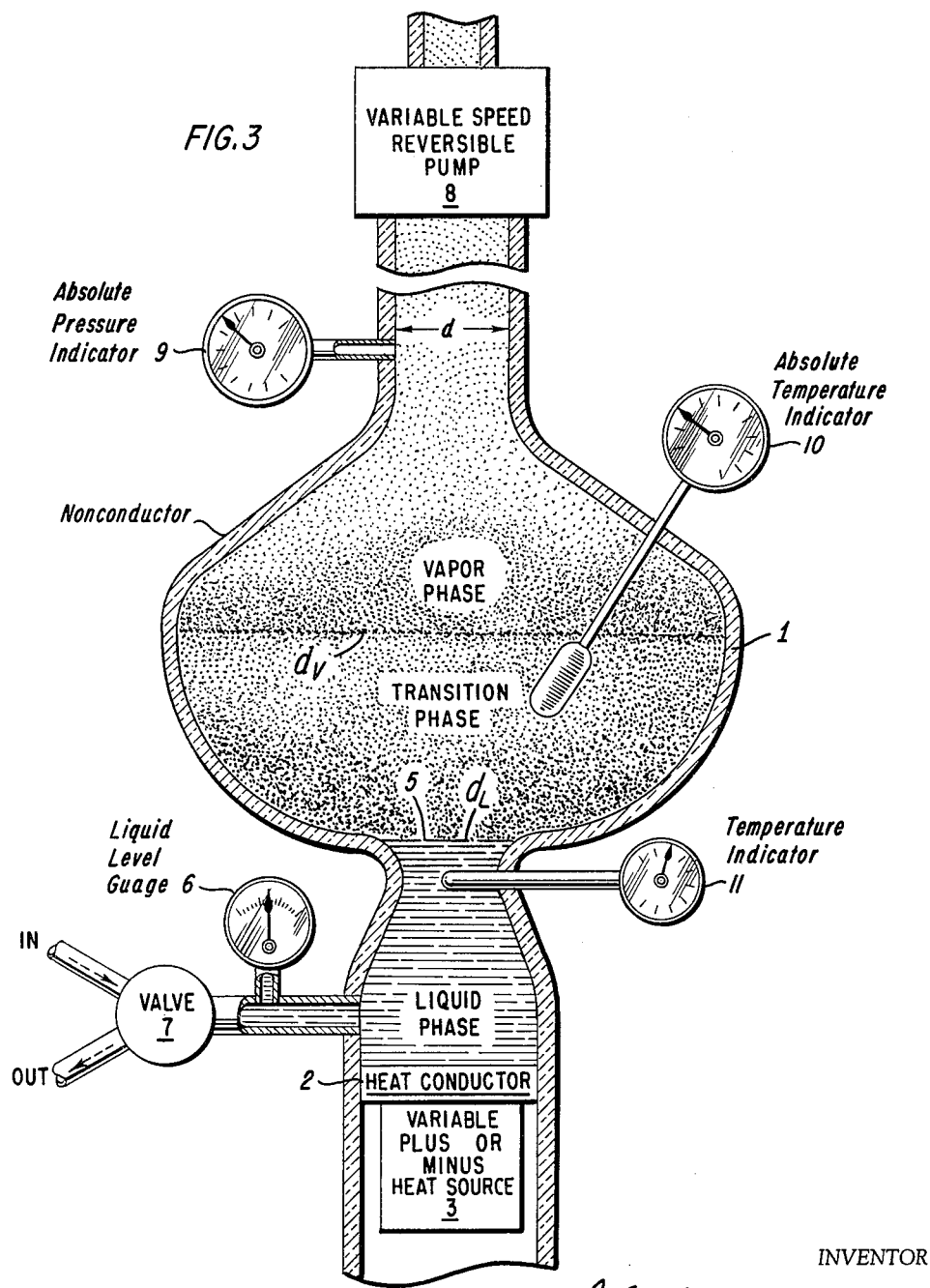

3,213,927
METHOD AND APPARATUS FOR THERMODYNAMIC TREATMENT OF FLUIDS
Clarke C. Minter, 1570 30th St. NW., Washington, D.C.
Filed July 17, 1963, Ser. No. 297,175
1 Claim. (Cl. 165—14)

This application is a continuation-in-part of my copending application Serial No. 107,149, filed May 2, 1961, entitled "Method of an Apparatus for Thermodynamic Treatment of Fluids," now abandoned.

This invention relates to thermodynamic processes and describes a novel method of and apparatus for varying or controlling the specific internal energy of a fluid at a given temperature.

It is well known that according to classical thermodynamics the specific internal energy of a gas is directly proportional to its absolute temperature. The "ideal" gas law for 1 mole of gas is $(PV)=RT$, where P is absolute pressure, T is absolute temperature, V is volume and R is the so-called gas constant. Since the product (PV) has the same dimensions as work or energy it can be taken as a measure of the specific energy content U of a perfect gas, and we can write $U/T=R$, which states that the ratio of the specific energy content of a gas to its absolute temperature is a constant. That is, according to classical thermodynamics one mole of an ideal gas or vapor at a given absolute temperature always contains the same quantity of thermal energy, which means that the value of (PV) at that temperature would be invariable, and so would be any other physical properties dependent on the energy content, such as specific gravity, viscosity, and thermal conductivity.

However, in a report published in the Journal of Applied Physics, volume 19, page 217 (1948) I have shown experimentally that the physical properties of a "real" gas such as nitrogen obtained by fractional distillation of liquid air are appreciably different from those of atmospheric nitrogen, and I have formulated a theory which gives a reasonable explanation of these observations. Employing the principles of this theory as a basis, I have invented a method of and apparatus for changing at will the specific energy content of a fluid at a given absolute temperature.

The primary object of this invention, therefore, is to provide a process for changing the specific energy content of a fluid at a given absolute temperature.

Another object of this invention is to provide a process for changing appreciably those physical properties of a fluid which are dependent on its specific internal energy content.

Another object of this invention is to provide an apparatus for carrying out the process of changing the specific internal energy of a fluid at a given temperature by varying the rate at which the fluid is converted from one phase to another, either from liquid to vapor or from vapor to liquid.

The invention can be understood by referring to the accompanying drawings as follows:

FIG. 3 is a schematic representation of one embodiment of this invention;

Figure 1:
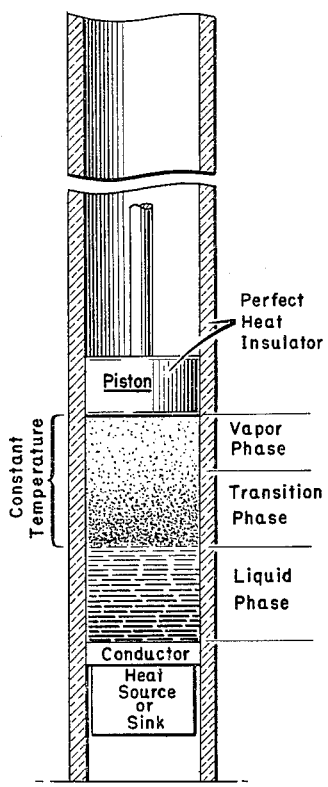
FIG. 1 is a simple schematic representation of an ideal device extensively employed in engineering textbooks to illustrate some of the ideal operational concepts of Classical Thermodynamics, and is not a part of this invention, being used here solely to facilitate the comprehension of the basic theoretical principles involved in the novel thermodynamic process disclosed in this invention.
Figure 4:
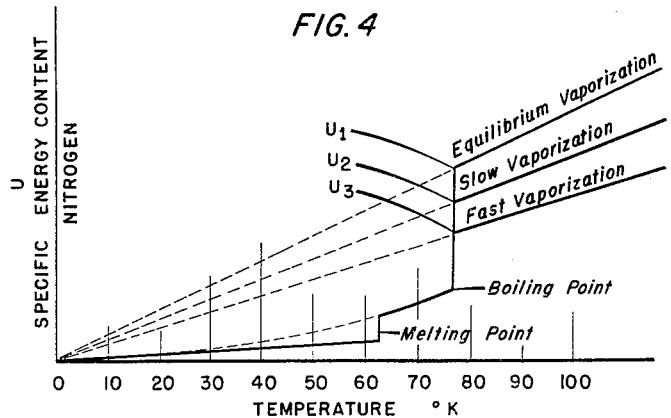
Figure 5:
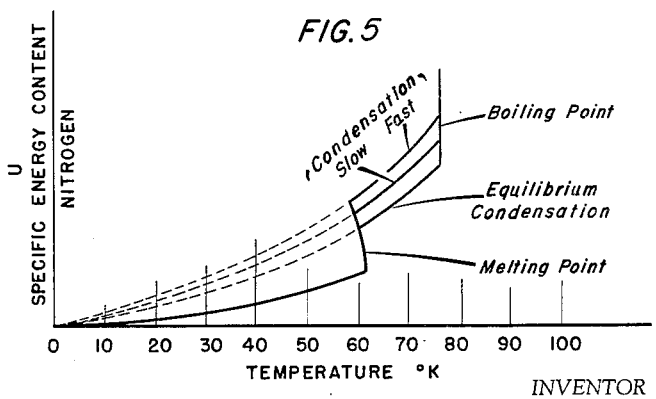

FIG. 4 shows graphically how the specific energy content of the vapor phase depends on the rate of vaporization of the liquid phase, whether carried out in the vessel of FIG. 1 or in that shown in FIG. 3; and FIG. 5 is a graph showing how the specific energy content of the liquid phase depends on the rate of condensation of the vapor phase, whether carried out in the vessel of FIG. 1 or in that of FIG. 3.

FIG. 1 shows a simple cylindrical vessel fitted with a piston, which can be moved up or down by a force actuated by a source of power which is entirely independent of the "Heat Source or Sink." This device is used here to illustrate (1) what happens when a fluid is converted irreversibly from liquid to vapor, or vice versa, at a finite rate in a vessel designed for an infinitely slow process and (2) why the process taking place in a finite time should be carried out in a special vessel such as that disclosed in FIG. 3 of this invention. The walls of the cylinder and the piston are made of heat insulating material, while the bottom of the vessel is made of a good heat conductor. The heat conductor can be placed in contact with a heat source for vaporization or with a heat sink for condensation, while the temperature of the vapor and the surface of the liquid phase remain essentially constant at the temperature of vaporization or condensation. Between the liquid phase and the vapor phase is shown the transition phase in which the process of isothermal vaporization takes place. In the transition phase the density of the fluid decreases from $\rho$ liquid to $\rho$ vapor while the increasing velocity of the upward moving fluid develops considerable turbulence.

Figure 2:
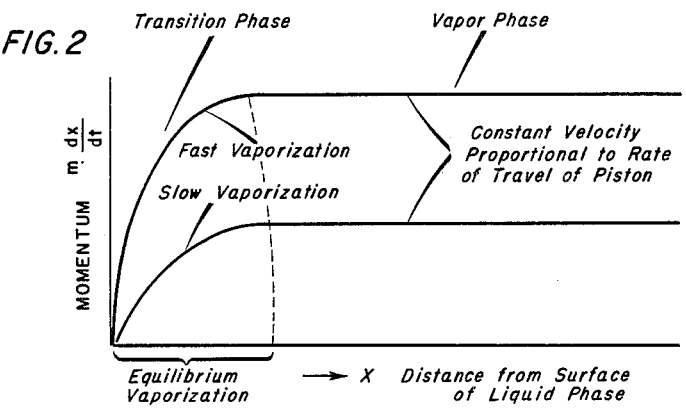
FIG. 2 is a graphical illustration of how the momentum of the vaporizing fluid varies in the transition phase between the liquid phase and the vapor phase in the column of FIG. 1.

In FIG. 2 the transition phase between the liquid phase and the vapor phase is shown graphically as the zone in which the internal latent heat of vaporization is added during vaporization or removed during condensation. According to the theory which I have formulated to explain variations in the specific energy content of a fluid the final specific energy content of the freshly evaporated vapor phase, or the newly condensed liquid phase, depends on the length of time spent in the transition phase, or on the rate at which the fluid is converted from the liquid phase to the vapor phase, or from the vapor phase to the liquid phase.

Taking up first the effect of rate of vaporization on the specific energy of the vapor phase suppose that the piston in FIG. 1 moves out with infinite "slowness," or at zero rate. It would take an infinite time to vaporize one mole of the liquid under such "equilibrium" or reversible conditions, but the specific energy content of the vapor so formed would be a maximum. If the piston is moved out at a finite rate and heat is allowed to flow from the heat source at such a rate that the temperature of the surface of the liquid remains essentially constant during the vaporization, then conditions exist for the formation of the transition phase in which the fluid is gradually converted from liquid to vapor. The faster the piston is moved out the faster the liquid phase leaves the surface and the greater is the velocity acquired by the fluid while passing through the transition phase. The graph in FIG. 2 shows momentum or velocity acquired in the transition phase plotted against the distance from the surface of the liquid phase. The figure shows that the mass $m$ of fluid accelerates upward through the transition phase and in doing so creates considerable turbulence in the ascending fluid. The difference between reversible and irreversible vaporizations are brought out clearly in the graph of FIG. 2. For the reversible vaporization the velocity through the transition phase is zero; in fact there is no transition phase under such conditions. In quasi-static or reversible vaporization the vapor phase has a uniform density and is in equilibrium with the liquid phase, and most of the heat of vaporization appears as internal energy of the vapor phase since only a relatively small fraction of the heat added is converted to work in the volume increase against external pressure.

On the other hand when the piston in FIG. 1 is moved up at a finite rate and heat flows into the liquid phase at a corresponding rate fluid will leave the surface at a finite rate and a steady state with a density gradient varying from $\rho_L$ to $\rho_V$ (L and V stand for liquid and vapor) will be set up in the transition phase. Because the normal 3-dimensional expansion of the vaporizing fluid is restricted by the cylinder wall to only one dimension there will be considerable turbulence as the fluid acquires momentum in the transition phase where work is done against gravity and two additional mechanical forces, inertia and viscosity, each of which requires expenditure of some of the heat of vaporization which would otherwise appear as internal energy of the vapor phase.

It is possible to set up an energy balance for the irreversible vaporization process taking place in the device shown in FIG. 1. At the boiling temperature T and pressure P let $U_V$ be the internal energy of the vapor phase, $U_L$ the internal energy of the liquid phase, $\Delta H$ the heat of vaporization and $W_{total}/J$ the heat equivalent of all work done, where J is the mechanical equivalent of heat. According to the first law of thermodynamics we have for unit mass of fluid $$U_V = U_L + \Delta H - W_{total}/J \qquad (1)$$

$W_{total}$ includes the following terms:

(1) External work or $P\Delta V$, where $\Delta V$ is the change in volume during vaporization, which for unit mass, is equal to the ratio of the density of the liquid phase to the density of the vapor phase $\rho_L/\rho_V$ at the boiling point and pressure;

(2) $W_{vis}$, or work per unit mass against viscous forces produced by the high degree of turbulence in the transition phase, the end result of which is a heating effect due to friction which increases the temperature of vapor phase;

(3) Kinetic energy $KE = S^2/2$ for unit mass vaporized where S is velocity in the transition phase or vapor phase. When moving column of vapor is brought to rest the KE produces a heating effect; and (4) Potential energy $gh$ where $h$ is the average height unit mass of fluid is lifted against gravity and $g$ is acceleration of gravity.

Taking into account the losses listed above the internal energy of the vapor phase after irreversible vaporization $_{irr}U_V$ per unit mass is $$_{irr}U_V = U_L + \Delta H - 1/J[P\Delta V + W_{vis} + S^2/2 + gh] \qquad (2)$$

$1/J(W_{vis} + S^2/2)$ is the part of the heat of vaporization dissipated in the form of heat which is removed when the temperature of the vapor phase is reduced to the normal boiling temperature after bringing the moving column of vapor to rest.

The energy valance in Eq. 2 can be compared with $$_{rev}U_V = U_L + \Delta H - 1/J(P\Delta V) \qquad (3)$$

for reversible vaporization, and the difference between the internal energy of the vapor phase after reversible vaporization and after irreversible vaporization per unit mass is $$\Delta U = (_{rev}U_V - _{irr}U_V) = 1/J[W_{vis} + S^2/2 + gh]. \qquad (4)$$

In most cases the loss in internal energy due to $S^2/2$ and $gh$ in Eq. 4 is negligible compared with $W_{vis}$. While not large the total heat equivalent of the difference in the work done in fast vaporization and in reversible vaporization is appreciable and could be of sufficient magnitude to account for the observed (1 to 2%) anomalous physical properties of cylinder nitrogen referred to above. In the above treatment it is assumed that $\Delta H$ is the same for both reversible and irreversible vaporization and that the internal energy of the liquid phase $U_L$ is the same in both cases.

FIG. 4 shows hypothetically the difference in the specific energy content of nitrogen vapor after equilibrium vaporization, slow vaporization and fast vaporization. It can be seen that the vapor produced by fast vaporization has the lowest specific energy content, which is to be expected according to the graphs in FIG. 2, showing that in a fast vaporization an appreciable part of the increase in internal energy has to be used to impart a turbulent momentum to the vapor while being accelerated rapidly upward through the transition phase.

FIG. 3 displays schematically one embodiment of this invention designed to reduce the "irreversibility" of the vaporization process occurring in the simple prior art device of FIG. 1. The walls of the vessel 1 shown in FIG. 3 are made of good heat-insulating material so that practically the only heat flowing into or out of the liquid phase is the heat of vaporization passing through the heat conductor 2 at the bottom of the column. The heat energy is supplied or removed by a variable positive or negative heat source 3 (electrical or otherwise) in contact with the conductor. In condensation the heat liberated is absorbed by a variable heat sink or refrigerator. The bottom of the column is in communication with a high-level reservoir (not shown) of the liquefied gas for the vaporization process or a low-level receiver (not shown) for the condensation process. The level of the liquid phase in the column can be kept at a certain point 5 on the liquid-level gage 6 by means of a valve 7 in the pipe connecting the vaporizing column to the reservoir. A variable speed pump 8 at the top of the column can be used either as a suction pump to remove vapor from the transition phase during vaporization, or as a pressure blower to force vapor down into the transition phase during condensation. An absolute pressure indicator 9 and two temperature indicators 10 and 11 show the pressure and temperature existing in the column. In order to keep the temperature and pressure constant during a process the rate of movement of vapor into or out of the top of the column, and the rate of movement of liquid into or out of the bottom of the column must both be coordinated with the flow of heat upward or downward through the heat conductor in contact with the liquid phase, in such a manner that the action of the pump neither adds to nor subtracts from the energy content of the vapor.

The difference between the dynamics of vaporization in the vessel of FIG. 1 and in the vessel of FIG. 3 can be illustrated by means of an actual example. Suppose that liquid nitrogen at a pressure of 1 atm. and a temperature of 77.3° K. is being distilled at a rate of $m$ grams/sec. in the vessel of FIG. 1. If the density $\rho_L$ of liquid nitrogen at 77.3° K. is 0.808 gm./ml. and the density $\rho_V$ of the vapor at the same temperature and pressure is 0.0049 g./ml. then the ratio of volumes per unit mass is $$V_V/V_L = \rho_L/\rho_V = 0.808/0.0049 = 169.00 \qquad (5)$$

This means that if liquid nitrogen leaves the surface of the liquid phase at the rate of 1 cm./sec. then at a given point in the tube the vapor must be moving upward with a velocity of 169 cm./sec. In the transition phase shown in FIG. 1 the density decreases from 0.808 to 0.0049, and because of the uniform diameter of the column, the upward motion of the fluid is accelerated from 1 cm./sec. to 169 cm./sec. FIG. 2 shows how the velocity increases in the transition phase for different rates of vaporization, and it is during this period of turbulent acceleration that some of the internal energy of the vaporizing fluid is dissipated as heat by the action of viscous forces. The relative effect of different rates of vaporization on the final internal energy of the vapor is shown in FIG. 4, and in order to reduce this loss of internal energy it is obviously necessary to diminish the turbulent acceleration taking place in the transition phase. This loss in internal energy can be reduced or eliminated if the distillation column is so designed that the vaporizing fluid moves through the transition zone at a constant velocity, thereby eliminating most, if not all, of the turbulence produced in the transition zone of FIG. 1.

FIG. 3 shows that in the section of the column occupied by the transition phase the diameter of the distillation column increases as the distance above the surface of the liquid phase increases, after which the diameter is reduced arbitrarily to a convenient size. The increase in diameter of the section containing the transition phase takes place so that, as the density of the vaporizing fluid diminishes, its upward motion remains constant in velocity. For this condition to prevail it is necessary for the cross-section area A of the column to be related to the density $\rho$ of the vaporizing fluid passing through the area by the relation $A\rho^{2/3}$=constant, or $$A_L \rho_L^{2/3} = A_V \rho_V^{2/3} \tag{6}$$

in which L and V stand for liquid and vapor. Solving for $A_V$ in Eq. 6

$$A_V = (\rho_L/\rho_V)^{2/3} A_L$$

and since $$\frac{\rho_L}{\rho_V} = 169$$

from Equation 5 we have $A_V = (169)^{2/3} A_L$.

Since diameter $d$ is proportional to $A^{1/2}$, we find the diameter of the column at its widest point to be $$d_V = (169)^{1/3} d_L = 5.53 d_L \tag{7}$$

That is, in order for the vapor passing through the section of the column where the diameter is $d_V$ to have the same upward velocity as the liquid passing through the section where the diameter is $d_L$ the diameter $d_V$ must be 5.53 times the diameter $d_L$.

FIG. 3 shows a reduction in diameter above the transition zone of the column. It is clear that this reduction in diameter can have no effect on the internal energy of the completely vaporized fluid once the minimum density $\rho_V$ has been attained.

FIG. 5 relates to the condensation process and shows relatively the effect of rate of condensation on the internal energy of the liquid nitrogen produced by an increase in density from the top to the bottom of the transition phase. The principle involved here is the same as that discussed above for vaporization. Since the velocity with which the fluid moves downward in the transition phase is constant, the degree of turbulence is greatly reduced, and the internal energy lost by dissipation as heat is accordingly diminished. Eq. 4 deduced above for vaporization applies equally well for condensation except that the algebraic signs are reversed for all terms in the equation except $W_{vis}$.

It is understood that the embodiment shown in FIG. 3 is presented for purposes of illustration and that various changes may be made in the method and apparatus disclosed without departing from the spirit and intent of the present invention. The scope of the invention can be clearly understood by referring to the appended claim.

I claim:

Thermodynamic processing device for changing the phase of a fluid comprising in combination an integrated column having a bottom chamber of suitable cross-section area for the liquid phase, a top chamber of suitable cross-section area for the vapor phase, an intermediate section between the top and the bottom chambers in which the cross-section area increases from bottom to top in accordance with the rule that the product

[area $\times$ (fluid density)$^{2/3}$]

is essentially constant, means for indicating temperature and pressure in the column, separate controlled means for simultaneously introducing and removing at suitable rates two phases of the fluid, and variable means for adding or removing heat energy to or from the liquid phase so that temperature and pressure in the column remain essentially constant.

References Cited by the Examiner

Publications:

Chemical Process Principles, by Hougen et al., part I, 2nd ed. (p. 293 relied on), published by John Wiley and Sons, Inc., New York, 1956.

Thermodynamic Fundamentals, by Warner, Ames, Iowa (pp. 12–21 relied on), published by Littlefield, Adams & Co., 1957.

ROBERT A. O'LEARY, *Primary Examiner.*

CHARLES SUKALO, *Examiner.*